United States Patent [19]

Jones et al.

[11] Patent Number: 5,725,944
[45] Date of Patent: *Mar. 10, 1998

[54] POLYESTERS FOR METAL LAMINATION

[75] Inventors: Allan S. Jones, Church Hill; Alan W. White, Kingsport, both of Tenn.

[73] Assignee: Eastman Chemical Company, Kingsport, Tenn.

[*] Notice: The portion of the term of this patent subsequent to May 17, 2013, has been disclaimed.

[21] Appl. No.: 434,884

[22] Filed: May 4, 1995

Related U.S. Application Data

[63] Continuation of Ser. No. 61,946, May 17, 1993, abandoned.

[51] Int. Cl.$^6$ ............................................... B29D 22/00
[52] U.S. Cl. ...................... 428/336; 428/458; 428/480; 428/910; 528/308.6
[58] Field of Search ............................... 428/910, 458, 428/480, 213, 336; 528/308.6

[56] References Cited

U.S. PATENT DOCUMENTS

| | | | |
|---|---|---|---|
| 2,698,239 | 12/1954 | Alles et al. | 95/9 |
| 4,048,253 | 9/1977 | Ooba et al. | 260/858 |
| 4,154,918 | 5/1979 | Buxbaum et al. | 528/176 |
| 4,352,925 | 10/1982 | Petke et al. | 428/481 |
| 4,381,356 | 4/1983 | Marsh | 523/521 |
| 4,418,116 | 11/1983 | Scott | 428/288 |
| 4,983,653 | 1/1991 | Fukuda et al. | 524/91 |
| 4,985,538 | 1/1991 | Fukuda et al. | 528/305 |
| 5,132,391 | 7/1992 | White et al. | 528/272 |
| 5,137,762 | 8/1992 | Aizawa et al. | 428/35.8 |
| 5,149,389 | 9/1992 | Heyes et al. | 156/272.4 |
| 5,318,648 | 6/1994 | Heyes et al. | 156/244.24 |
| 5,340,624 | 8/1994 | Sublett | 428/35.8 |

FOREIGN PATENT DOCUMENTS

| | | |
|---|---|---|
| 0267799 | 5/1988 | European Pat. Off. . |
| 2238981 | 9/1990 | United Kingdom . |

OTHER PUBLICATIONS

European Patent Application 0 267 799 filed 12 Nov. 1987.
European Patent Application 0 402 004 A1 filed 23 May 1990.
UK Patent Application GB 2 238 981 A filed 17 Sep. 1990.
European Patent Application 0 415 345 A2 filed 28 Aug. 1990.

*Primary Examiner*—Stevan A. Resan
*Attorney, Agent, or Firm*—Karen A. Harding; Harry J. Gwinnell

[57] ABSTRACT

Disclosed are poly(ethylene-co-diethylene terephthalate) polyesters useful for making thin films. The polyesters have a diethylene glycol repeat unit component of about 10–30 mol %. These polymers can be converted into thin films and are useful as protective barrier films, especially in packaging applications. These copolyesters can be used to make biaxially oriented films for metal lamination.

4 Claims, No Drawings

POLYESTERS FOR METAL LAMINATION

This is a continuation of application Ser. No. 08/061,946 filed on May 17, 1993, now abandoned.

BACKGROUND OF THE INVENTION

1. Field of the Invention

This invention concerns poly(ethylene-co-diethylene terephthalate) polyesters useful for making thin films. More specifically, this invention concerns poly(ethylene-co-diethylene terephthalate) polyesters where the diethylene glycol (DEG) repeat unit component is about 10–30 mol %. These polymers can be converted into thin films and are useful as protective barrier films, especially in packaging applications. These compositions can be used to make biaxially oriented films for metal lamination. The metal/polymer laminations have many uses including precoated metal stock for aluminum and steel can manufacturing.

2. Description of the Prior Art

Polyesters made from terephthalic acid (or dimethyl terephthalate), ethylene glycol (EG), and diethylene glycol are well known in the art but it is believed that the critical ranges of the monomers used in making the polyester for thin film applications which require adequate strength and tear properties are novel. U.S. Pat. No. 2,698,239 discloses photographic film supports coated with polyesters selected from terephthalate polyesters which contain a polymethylene glycol of 2–10 methylene groups. This patent discloses the broad range of ethylene terephthalate copolyesters containing 20–100% diethylene glycol. U.S. Pat. No. 4,048,253 discloses ethylene terephthalate copolyesters containing 30–100 mol % diethylene glycol. U.S. Pat. No. 4,154,918 discloses ethylene terephthalate copolyesters containing 5–30 mol % isophthalic acid and 40–80 mol % diethylene glycol.

U.S. Pat. No. 5,132,391 discloses the use of diethylene glycol containing ethylene terephthalate copolyesters wherein the acid component contains at least 75 mol % terephthalic acid and the diol component consists of ethylene glycol and diethylene glycol in the ratios 9:1 to 1:1 and contains a copolymerizable phosphorus containing compound. U.S. Pat. No. 4,418,116 discloses ethylene terephthalate copolyesters with 20–45% diethylene glycol and U.S. Pat. No. 4,352,925 teaches the use of ethylene terephthalate copolyesters with 30–50 mol % diethylene glycol as adhesives. U.S. Pat. No. 4,352,925 also contains a summary of diethylene glycol containing polyesters.

There exists a need for a polyester thin film which can be laminated to either aluminum or steel, on one or both sides, and then subsequently drawn into a beverage or food can. This is in part due to increasing environmental pressure on can makers to get away from organic solvents that are used to dissolve or disperse the epoxy coatings that are conventionally used to coat most cans made today. A metal/plastic laminate allows one to make a can in the complete absence of organic solvents. There have been several disclosures in this area of the art.

European Patent Application 402,004A1 discloses laminates of aluminum and ethylene terephthalate copolyester films. The disclosed copolyester contains 0–40 mol % comonomers that can include isophthalic acid and diethylene glycol. The copolyester must have a melting point of 200°–260° C.

U.S. Pat. No. 5,149,389 discloses a laminated metal sheet which is useful for can making. The polymeric film is an ethylene terephthalate copolyester with a melting point of 200°–270° C. The comonomers of use listed in this disclosure include isophthalic acid, diethylene glycol, and 1,4-cyclohexanedimethanol at levels of 0–40 mol %. Polyethylene terephthalate (PET) copolymers containing greater than about 15 mol % isophthalic acid are slow to crystalline and are thus difficult to manufacture on a large scale. PET copolymers containing greater that about 30 mol % diethylene glycol are also slow to crystallize and difficult to handle on a manufacturing scale.

Great Britain Patent Application 2,238,981A discloses a process for making draw-redraw cans. This process uses metal/polymer laminate for drawing into cans. The polymers mentioned are ethylene terephthalate copolymers with at least 75 mol % of the acid component being terephthalic acid and at least 75 mol % of the diol component being ethylene glycol. Diethylene glycol was mentioned in the list of possible glycol-modifying agents. Also disclosed is the need for this polymer to have a melting point of 210°–252° C. to allow for optimal laminating conditions. Isophthalic acid was the dominant comonomer in this art.

European Patent Application 415,345A2 discloses the use of diethylene glycol in ethylene terephthalate copolymers for steel lamination. The steel/copolyester laminates can be used for can making.

DESCRIPTION OF THE INVENTION

This invention provides poly(ethylene-co-diethylene terephthalate) copolyesters that can be formed into biaxially oriented films for various applications. Particularly, this invention describes PET copolyesters with 10–30 mol % diethylene glycol. These films are good for various packaging applications including coatings for metals, paper, paperboard, various plastics, wood, ceramics, woven and .nonwoven fabrics, leather, and the like. In addition to being useful as coatings or adhesives for the above-described substrates, the free films are also useful for wrapping and packaging applications involving food and other articles such as clothing, tools, records, toys, toilet articles, gift items, and the like. In the packaging of foods, the good moisture barrier properties of the films are important. Oriented, heat-set films may be used for standard wrapping applications. Oriented films which have not been heatset are generally used for shrink wrap applications.

The polymers of this invention are particularly useful for laminating or coating of various metals used in the manufacture of cans. Such cans are useful as containers for beverages, food, and the like. Typical metals used for the manufacture of cans include aluminum, steel, tin coated steel, zinc coated steel, chrome coated steel, nickel coated steel, blackplate, or phosphated blackplate which is preferably chromate rinsed after phosphating and the like., It has been found that the composition of the copolyester is quite critical with regard to can coating or can lamination procedures. For example, the tin coating on tin coated steel melts at about 230° C. Therefore, coatings or adhesives with melting points higher that about 230° C. are not suitable for this application. It has been found that PET copolyesters containing 10 mol % diethylene glycol have a melting temperature of 230° C. and they provide good adhesion to aluminum, steel, and the various coated steels used in can making. Also, these copolyesters have good moisture vapor barrier properties. This is important in steel cans to prevent iron from being leached out of the metal walls of steel cans by beverages or food products containing water. PET or PET copolyesters containing less than 10 mol % modification are not useful because they do not melt or form bonds with the metal substrates under the preferred bonding conditions. PET copolyesters containing about 30 mol % diethylene glycol represent the upper range of diethylene glycol-modified PET polymers operable for this application. Such copolyesters have a melting temperature of about 185° C., are crystallizable in air at temperatures of about 60° C. to about 130° C., have adequate moisture vapor barrier resistance, and provide good coatings or bonds on the various metal can stocks at temperatures of 230° C. or less.

PET copolyesters with greater than 30 mol % diethylene glycol cannot be readily crystallized in air because the optimum crystallization temperature in air is high enough to cause the polymer to flow and stick together. This becomes a major problem in large scale manufacturing of copolymers containing high concentrations of diethylene glycol. Also, the moisture vapor transmission rate of the copolyesters increases rapidly as the concentration of diethylene glycol in the copolyesters is increased above 30 mol %. Thus, operable copolyesters in this invention contain about 10 to about 30 mol % diethylene glycol. Preferred copolyesters contain about 15 to about 25 mol % diethylene glycol.

This invention is useful for various packaging and adhesive applications. Examples include, but are not limited to, aluminum and steel laminates for can making, wood laminates, adhesive applications, coextrusion structures, coated substrates and the like.

The copolymer must have at least 85 mol % of the acid component as terephthalic acid, preferably at least 95 mol %. The glycol component must be 70–90 mol % ethylene glycol and 10–30 mol % diethylene glycol. The total mole percents for ethylene glycol and diethylene glycol must be at least 90 mol %, preferably greater than 95 mol %. This poly(ethylene-co-diethylene terephthalate) copolymer may contain small amounts of other comonomers. Comonomers may include 2,6-naphthalenedicarboxylic acid, 2,7-naphthalenedicarboxylic acid, 4,4'-biphenyl-dicarboxylic acid, p-hydroxybenzoic acid, isophthalic acid, 1,4-cyclohexanedicarboxylic acid, and aliphatic diacids or diols containing 2 to 20 carbon atoms, and other polyester forming diacids and diols generally known in the art. The comonomers may also include the diesters of any of the aforementioned diacids. The copolymer may also contain small amounts of chain branching agents and/or chain termination agents.

The polyesters described in this invention are prepared by conventional polymerization methods which are well known in the art. The polyester is prepared from either terephthalic acid or dimethyl terephthalate with ethylene glycol and diethylene glycol in the presence of catalyst metals. The polymer is prepared by melt phase polycondensation methods and may optionally be subjected to solid-state polymerization methods to provide polymers with high molecular weights. The copolymers are readily prepared by either batch or continuous processes.

The polyester can have an inherent viscosity of 0.3 to 1.5 dL/g, preferably 0.5–1.1 dL/g.

The polyester compositions described in this invention may contain-additives generally known in the art. These include nucleation or crystallization aids, surface lubricants, denesting agents, stabilizers, antioxidants, ultraviolet light absorbing agents, pigments, colorants, and the like.

The polyesters described herein may also contain inorganic materials such as black iron oxide.

The copolyesters of this invention are readily extruded into flat or tubular films. Such films can be readily biaxially oriented and heatset using conventional techniques. These oriented films are valuable shrink-wrap film for the packaging of foods and other items. The copolyester films may also be laminated to one or both sides of metal strips and the laminates can be further processed into metal cans used for beverages and foods. In making such copolyester/metal and copolyester/metal/copolyester laminates, preheated metal sheeting and copolyester film from feed rolls are fed to lamination rolls. Uniform, intimate, and wrinkle-free contact between the preheated metal sheet and the polymer films is made in the lamination nip. Such laminations are generally made at temperatures in the range of about 180° C. up to about 260° C.; depending on the metal used and the melting point of the copolyester. By means of flame, induction, infrared, or oven heating, the laminates are reheated to temperatures in the range of about 225° C. to about 280° C. and the laminates are then quenched (usually in water) to a temperature below the glass transition temperature of the copolyester to insure that the copolyester coating is in an amorphous state. Can blanks cut from the copolyester/metal or copolyester/metal/copolyester laminates are readily drawn and wall ironed (DWI) or drawn and redrawn (DRD) into cans. Generally, the exterior copolyester layer will contain pigments such as $TiO_2$ in order to be able to print and/or decorate the exterior surface of the can. The copolyester films produced in accordance with this invention have a thickness of about 5 to about 50 microns, preferably about 9 to about 25 microns.

The thickness of the metal used to make cans is about 0.05 to about 0.5 mm for steel and about 0.02 to about 0.5 mm for aluminum can stock.

In addition to the coating of metal can sheeting, it is also possible to laminate the copolyesters of the present invention to aluminum or tin foil for subsequent use in food pouches, such as potato chips, cookies, and the like. The coating on the foil makes it possible to heat seal the packages. As in the beverage/food can application, the exterior layers of the food pouch laminates generally contain pigments such as $TiO_2$ for printing and decoration purposes.

EXAMPLES

The following examples are submitted for a better understanding of the invention.

The analytical data provided in these examples were determined by the following methods.

Tensile Strength, Elongation at Break, Tangent Modulus: ASTM method D882

Elmendorf Tear Resistance: ASTM method D1922

T-peel Strength: ASTM method D1876 (modified as described in Example 18)

Water Vapor Transmission Rate: ASTM method F372

Density Measurements: In a density gradient column

Thermal Analysis (DSC): Measured at a scan rate of 20° C./min. after the sample was heated above its melting temperature and rapidly quenched below its glass transition temperature Inherent Viscosity: Determined at 25° C. with a 0.50 gram sample in 100 mL of 60/40 by weight solution of phenol/tetrachloroethane

EXAMPLES 1–5

Poly(ethylene-co-diethylene terephthalate) copolyesters are prepared using conventional techniques well known in the art, such as described in U.S. Pat. No. 4,352,925.

incorporated herein by reference. These copolyesters are prepared so as to have repeat units from 100 mol % terephthalic acid, and repeat units from ethylene glycol and diethylene glycol. The mol % of ethylene glycol (EG) and diethylene glycol (DEG) are given below. Example 5 is comparative, and uses a combination of terephthalic and isophthalic acids.

EXAMPLE 1

90 mol % EG, 10 mol % DEG
Inherent Viscosity: 0.708 dL/g
DSC data: Tg=71.6° C.; Tm=230.1° C.
NMR data: 10.4 mol % DEG
Density: 1.371 g/cm

EXAMPLE 2

82 mol % EG, 18 mol % DEG
Inherent Viscosity: 0.713 dL/g
DSC data: Tg=71.1° C.; Tm=226.2° C.
NMR data: 18.9 mol % DEG
Density: 1.368 g/cm$^3$

EXAMPLE 3

74 mol % EG, 26 mol % DEG
Inherent Viscosity: 0.747 dL/g
DSC data: Tg=59.7° C.; Tm=202.8° C.
NMR data: 25.6 mol % DEG
Density: 1.365 g/cm

EXAMPLE 4

68 mol % EG, 32 mol % DEG
Inherent Viscosity: 0.748 dL/g
DSC data: Tg=56.5° C.; Tm=183.7° C.
NMR data: 31.5 mol % DEG
Density: 1.362 g/cm

EXAMPLE 5 (COMPARATIVE EXAMPLE)

82 mol % terephthalic acid, 18 mol % isophthalic acid, 100 mol % EG
Inherent Viscosity: 0.721 dL/g
DSC data: Tg=76.7° C.; Tm=196.0° C.
NMR data: 18.0 mol % dimethyl isophthalate
Density: 1.361 g/cm

EXAMPLE 6

Melt cast (amorphous) film from poly(ethylene-co-diethylene terephthalate) [10 mol % DEG] was produced using a laboratory scale cast film line which consisted of a Killian extruder having a 1 inch diameter, a single flight screw, a 6 inch wide die, and a 500 micron die opening. The film passed over a chill roll and was collected on a tubular, cardboard roll. All heater zones were set between 262° C. and 270° C. The die was set at 268° C. with a Screw RPM of 65. This produced a measured melt temperature of 267° C., and an amperage reading of 3.5. The average thickness of the cast film was 250 microns. Prior to processing, the polymer was dried overnight at 120° C. in a dehumidified air dryer.

EXAMPLE 7

Melt cast (amorphous) film from poly(ethylene-co-diethylene terephthalate) [18 mol % DEG] was produced using a laboratory scale cast film line as described in Example 6. All heater zones were set between 249° C. and 255° C. The die was set at 255° C. with a screw RPM of 65. This produced a measured melt temperature of 250° C., and an amperage reading of 4.5. The average thickness of the cast film was 250 microns. Prior to processing, the polymer was dried overnight at 120° C. in a dehumidified air dryer.

EXAMPLE 8

Melt cast (amorphous) film from poly(ethylene-co-diethylene terephthalate) [26 mol % DEG] was produced using a laboratory scale cast film line as described in Example 6. All heater zones were set between 240° C. and 243° C. The die was set at 248° C. with a screw RPM of 65. This produced a measured melt temperature of 241° C., and an amperage reading of 4.5. The average thickness of the cast film was 250 microns. Prior to processing, the polymer was dried overnight at 120° C. in a dehumidified air dryer.

EXAMPLE 9

Melt cast (amorphous) film from poly(ethylene-co-diethylene terephthalate) [32 mol % DEG] was produced using a laboratory scale cast film line as described in Example 6. All heater zones were set between 230° C. and 232° C. The die was set at 243° C. with a screw RPM of 65. This produced a measured melt temperature of 231° C., and an amperage reading of 4.5. The average thickness of the cast film was 250 microns. Prior to processing, the polymer was dried overnight at 120° C. in a dehumidified air dryer.

EXAMPLE 10 (COMPARATIVE EXAMPLE)

Melt cast (amorphous) film from poly(ethylene isophthalate-co-terephthalate) [18 mol % isophthalate] was produced using a laboratory scale cast film line as described in Example 6. All heater zones were set between 231° C. and 237° C. The die was set at 242° C. with a screw RPM of 65. This produced a measured melt temperature of 230° C., and an amperage reading of 5. The average thickness of the cast film was 250 microns. Prior to processing, the polymer was dried overnight at 120° C. in a dehumidified air dryer.

EXAMPLE 11

Biaxially oriented film was produced from poly(ethylene-co-diethylene terephthalate) [10 mol % DEG] 250 micron melt cast film using a T. M. Long orienting machine. The film was stretched 4×4 at a temperature of 92° C. (Tg+20° C.) at a rate of 11.35 in./sec. in the X direction and 12.24 in./sec. in the Y direction. The final stress was 1.206 psi in the X direction and 971 psi in the Y direction. Immediately after the film was stretched, it was rapidly air cooled below its glass transition temperature. The final thickness averaged 19 microns.

The biaxially oriented sheet was then heatset while being secured in a metal frame for 1 minute at 140° C. The film was then allowed to cool before removing from the heatset frame. The inherent viscosity of the film was 0.652 dL/g and the percent crystallinity was 36.8% based on DSC data. The physical properties of the film are listed below.

| Property of Film | Machine (X) Direction | Transverse (Y) Direction |
| --- | --- | --- |
| Tensile Strength (psi) | 36,600 | 39,700 |
| Tangent Modulus (psi) | 546,000 | 615,000 |
| Elongation at Break (%) | 96 | 101 |
| Elmendorf Tear Resistance (g/mm) | 1,300 | 1,200 |

EXAMPLE 12

Biaxially oriented film was produced from poly(ethylene-co-diethylene terephthalate) [18 mol % DEG] 250 micron melt cast film using a T. M. Long orienting machine. The film was stretched 4×4 at a temperature of 90° C. (Tg +20° C.) at a rate of 11.54 in./sec. in the X direction and 12.21 in./sec. in the Y direction. The final stress was 501 psi in the X direction and 262 psi in the Y direction. Immediately after the film was stretched, it was rapidly air cooled below its glass transition temperature. The final thickness averaged 16 microns.

The biaxially oriented sheet was then heatset while being secured in a metal frame for 1 minute at 140° C. The film was then allowed to cool before removing from the heat-set frame. The inherent viscosity of the film was 0.693 dL/g and the percent crystallinity was 30.3% based on DSC. The physical properties of the film are listed below.

| Property of Film | Machine (X) Direction | Transverse (Y) Direction |
| --- | --- | --- |
| Tensile Strength (psi) | 22,600 | 36,400 |
| Tangent Modulus (psi) | 515,000 | 546,000 |
| Elongation at Break (%) | 59 | 109 |
| Elmendorf Tear Resistance (g/mm) | 3,600 | 3,600 |

EXAMPLE 13

Biaxially oriented film was produced from poly(ethylene-co-diethylene terephthalate) [26 mol % DEG] 250 micron melt cast film using a T. M. Long orienting machine. The film was stretched 4×4 at a temperature of 80° C. (Tg+20° C.) at a rate of 11.70 in./sec. in the X direction and 12.20 in./sec. in the Y direction. The final stress was 435 psi in the X direction and 253 psi in the Y direction. Immediately after the film was stretched, it was rapidly air cooled below its glass transition temperature. The final thickness averaged 15 microns.

The biaxially oriented sheet was then heatset while being secured in a metal frame for 1 minute at 140° C. The film was then allowed to cool before removing from the heatset frame. The inherent viscosity of the film was 0.731 dL/g and the percent crystallinity was 23.0% based on DSC. The physical properties of the film are listed below.

| Property of Film | Machine (X) Direction | Transverse (Y) Direction |
| --- | --- | --- |
| Tensile Strength (psi) | 27,900 | 32,300 |
| Tangent Modulus (psi) | 480,000 | 531,000 |
| Elongation at Break (%) | 106 | 93 |
| Elmendorf Tear Resistance (g/mm) | 2,800 | 2,800 |

EXAMPLE 14

Biaxially oriented film was produced from poly(ethylene-co-diethylene terephthalate) [32 mol % DEG] 250 micron melt cast film using a T. M. Long orienting machine. The film was stretched 4×4 at a temperature of 77° C. (Tg+20° C.) at a rate of 11.45 in./sec. in the X direction and 12.34 in./sec. in the Y direction. The final stress was 306 psi in the X direction and 145 psi in the Y direction. Immediately after the film was stretched, it was rapidly air cooled below its glass transition temperature. The final thickness averaged 14 microns.

The biaxially oriented sheet was then heatset while being secured in a metal frame for 1 minute at 140° C. The film was then allowed to cool before removing from the heatset frame. The inherent viscosity of the film was 0.715 dL/g and the percent crystallinity was 15.1% based on DSC. The physical properties of the film are listed below.

| Property of Film | Machine (X) Direction | Transverse (Y) Direction |
| --- | --- | --- |
| Tensile Strength (psi) | 29,700 | 30,000 |
| Tangent Modulus (psi) | 493,000 | 501,000 |
| Elongation at Break (%) | 128 | 104 |
| Elmendorf Tear Resistance (g/mm) | 3,000 | 3,200 |

EXAMPLE 15

Biaxially oriented film was produced from poly(ethylene isophthalate-co-terephthalate) [18 mol % isophthalate] 250 micron melt cast film using a T. M. Long orienting machine. The film was stretched 4×4 at a temperature of 97° C. (Tg+20° C.) at a rate of 11.75 in./sec. in the X direction and 12.39 in./sec. in the Y direction. The final stress was 617 psi in the X direction and 397 psi in the Y direction. Immediately after the film was stretched, it was rapidly air cooled below its glass transition temperature. The final thickness averaged about 15 microns.

The biaxially oriented sheet was then heatset while being secured in a metal frame for 1 minute at 140° C. The film was then allowed to cool before removing from the heatset frame. The inherent viscosity of the film was 0.695 dL/g and the percent crystallinity was 24.0% based on DSC. The physical properties of the film are listed below.

| Property of Film | Machine (X) Direction | Transverse (Y) Direction |
| --- | --- | --- |
| Tensile Strength (psi) | 35,200 | 38,200 |
| Tangent Modulus (psi) | 571,000 | 674,000 |
| Elongation at Break (%) | 104 | 74 |
| Elmendorf Tear Resistance (g/mm) | 2,800 | 3,100 |

EXAMPLE 16

The following table shows examples of the relationship between mole percent DEG in poly(ethylene-co-diethylene terephthalate) copolymers and melting point and percent crystallinity for biaxially-oriented and heat-set films.

| Mole Percent DEG | Tm | Crystallinity (%) |
| --- | --- | --- |
| 1.5 | 258.5 | |
| 3.9 | 256.5 | |
| 10 | 230.1 | 36.8 |
| 18 | 226.2 | 30.3 |
| 26 | 202.8 | 23.0 |
| 32 | 183.7 | 15.1 |

EXAMPLE 17

The following table shows examples of the relationship between mole percent DEG in poly(ethylene-co-diethylene terephthalate) copolymers and water vapor transmission rates in biaxially oriented films. Film thicknesses are approximately 100 microns. This example shows how the copolyester films become more permeable to water as the amount of DEG in the polymer is increased.

| Mole Percent DEG | WVTR* g/mm/100 cm$^2$/24 Hr |
| --- | --- |
| 10 | 19.9 |
| 18 | 23.7 |
| 26 | 33.8 |
| 32 | 40.0 |

*Water vapor transmission rate

EXAMPLE 18

These biaxially oriented copolyester films were laminated to aluminum. Approximately 1-inch square sections of film (18 microns thick) were placed between two 1×4 inch 300 microns thick sheets of No. 3104 aluminum and pressed together with a Sentinel heat sealer press for 20 seconds at 60 psi. The laminates were bonded at various temperatures. The following table shows examples of the relationship between mole percent DEG in poly(ethylene-co-diethylene terephthalate) copolymer films and T-peel strength. This table shows the drastic increase in bond strength when the level of DEG in the copolymer is 10 percent and above, especially at bonding temperatures of 230° C.

| | Peel Strength vs. Copolyester Composition: Aluminum Bonded at 215 and 230° C. | |
| --- | --- | --- |
| Mole Percent DEG | Peel Strength (g/mm) at 215° C. | Peel Strength (g/mm) at 230° C. |
| 2 | no bond | no bond |
| 10 | no bond | 31.7 |
| 18 | 25.0 | 80.1 |
| 26 | 72.9 | 104.0 |
| 32 | 83.3 | 107.0 |

EXAMPLE 19

These biaxially oriented copolyester films were laminated to steel plates. Approximately 1-inch square sections of film (18 microns thick) were placed between two 1×4 inch 380 microns thick sheets of steel and pressed together with a Sentinel heat sealer press for 20 seconds at 60 psi. The laminates were bonded at various temperatures. The following table shows examples of the relationship between mole percent DEG in poly(ethylene-co-diethylene terephthalate) copolymer films and T-peel strength. This table shows the drastic increase in bond strength when the level of DEG in the copolymer is 10 percent and above, especially at bonding temperatures of 250° C.

| | Peel Strength vs. Copolyester Composition: Steel Bonded at 230 and 250° C. | |
| --- | --- | --- |
| Mole Percent DEG | Peel Strength (g/mm) at 230° C. | Peel Strength (g/mm) at 250° C. |
| 2 | no bond | no bond |
| 10 | no bond | 98.9 |
| 18 | 22.6 | 64.2 |
| 26 | 111.8 | 98.7 |
| 32 | 114.5 | 123.7 |

We claim:

1. Biaxially oriented, film material having a thickness of from about 5 to about 50 microns, said film material comprising a copolyester having an inherent viscosity of from about 0.3 to about 1.5 dL/g, and comprising repeat units derived from a dicarboxylic component comprising at least 85 mol % terephthalic acid and a glycol component comprising about 70–90 mol % ethylene glycol and about 30–10 mol % diethylene glycol, wherein, for the glycol component, the total of repeat units from ethylene glycol and diethylene glycol are at least 90 mol % wherein said film has a peel strength on Aluminum of at least about 31.7 g/mm measured at 230° C.

2. Film material according to claim 1 wherein the repeat units from terephthalic acid are at least 95 mol % of the dicarboxylic component and the total repeat units from ethylene glycol and diethylene glycol are at least 95 mol % of the glycol component.

3. Film material according to claim 1 wherein the repeat units from diethylene glycol are at from 15 to 25 mol % of the glycol component.

4. Film material according to claim 1 which has a thickness of about 9 to about 25 microns.

* * * * *